April 24, 1945. A. C. D'ARCEY 2,374,336
FLOW REGULATING VALVE WITH LINEAR CHARACTERISTICS
Filed May 16, 1944 2 Sheets-Sheet 2
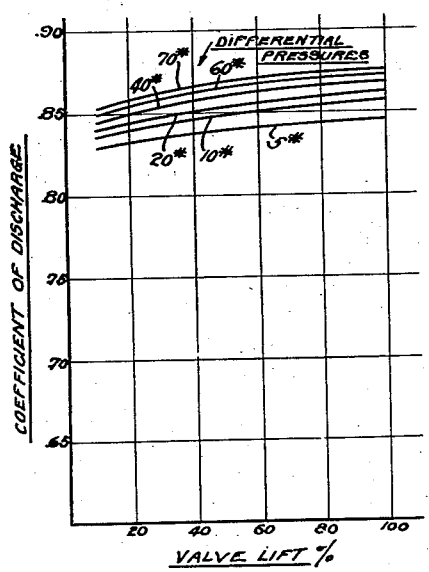
Fig. 6
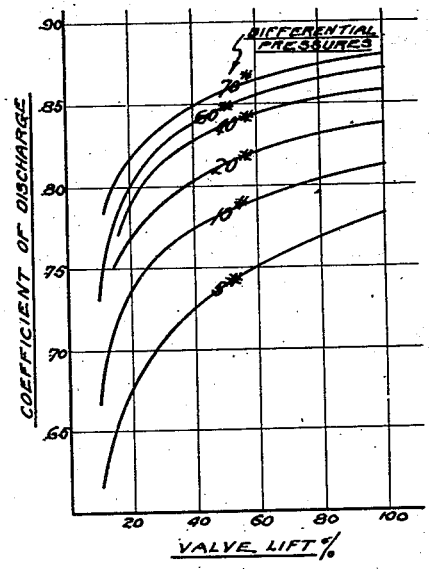
Fig. 7
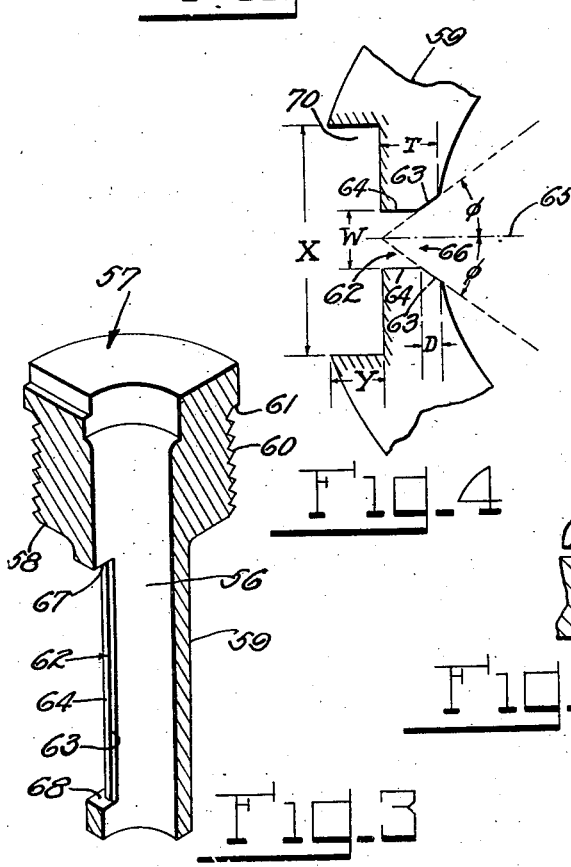
Fig. 4
Fig. 3
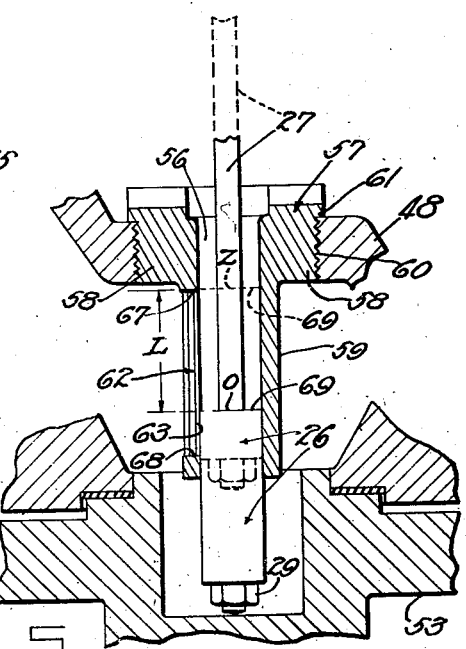
Fig. 5
INVENTOR
ALFRED C. D'ARCEY
by Cameron MacLeod
Atty.

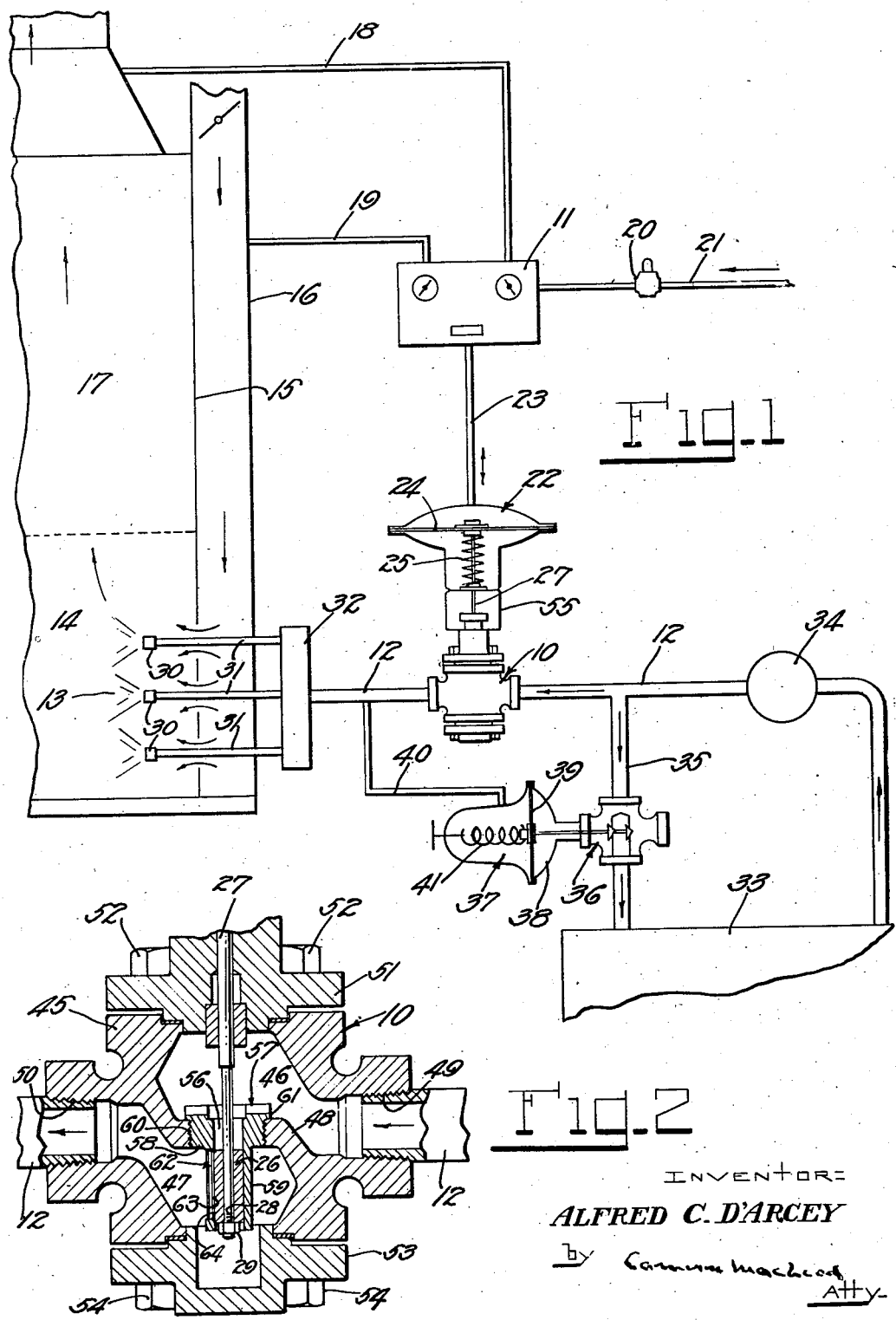

Patented Apr. 24, 1945

2,374,336

UNITED STATES PATENT OFFICE 2,374,336

FLOW REGULATING VALVE WITH LINEAR CHARACTERISTICS

Alfred C. D'Arcey, Milton, Mass., assignor to Mason-Neilan Regulator Co., Boston, Mass., a voluntary trust of Massachusetts Application May 16, 1944, Serial No. 535,842

8 Claims. (Cl. 251—27)

My invention relates to valves for regulating the flow of fluids and particularly concerns valve means wherein the quantity of fluid passing through the valve, under varying pressure differentials, is on a basis which is linear with valve lift.

The valve embodying this invention is herein illustrated as applied to the control of fuel oil to burners in the furnace of a steam generator, to hold the quantity of fuel supplied at a selected ratio in respect to the quantity of air admitted to the furnace under varying conditions of load demand, in order to maintain generator combustion at maximum efficiency. It will be understood, however, that the use of a valve embodying my invention in connection with the control of fuel oil to burners is by way of illustration only and that the valve may be employed equally well wherever it is desirable that the quantity of fluid passing through a valve be linear with valve lift under varying rate of flow conditions.

It will be understood by those skilled in the art that the theoretical quantity of fluid passing through a valve port may equal approximately the area of the valve opening multiplied by the square root of the pressure differential across the valve port, and it is further understood that the actual flow of fluid through a valve, as commonly constructed, varies from the theoretical flow by an amount represented by the coefficient of discharge. And since in valves, as heretofore constructed so far as known to me, the coefficient of discharge varies both with the orifice area and with the differential pressure across the valve port, it follows that where the area change is directly proportional with valve lift, the quantity change in fluid flow is non-linear with valve lift, even at a constant pressure differential. When the pressure differential is also varied, the situation is complicated further.

It will be apparent that a valve which governs fluid flow on a linear basis in respect to valve lift throughout its operating range and under varying pressure differentials, may be employed for a wide variety of purposes. For example, a fluid pressure operated valve may be governed by a controller responsive to a change in the value of a condition to vary fluid flow on a definite basis in relation to the condition value change, for the operating pressure may be a measure of the valve opening, and since the quantity of fluid passed by the valve is linear with the valve lift, the operating pressure governed by the controller is an exact measure of the quantity of fuel passed by the valve under selected pressure differentials.

It is, therefore, an object of this invention to provide a control valve which is capable of governing fluid flow under a plurality of pressure drops across the valve on a quantity basis which is linear with valve lift.

My invention will be more fully understood from the following description when taken in connection with the accompanying drawings and the novel features thereof will be pointed out in the claims.

In the drawings,

Fig. 1 is a view, partly diagrammatic, showing a valve embodying my invention governed by an instrument for varying the quantity of oil supplied to the burners of a steam generator at a definite ratio in respect to changes in the quantity of air supplied to the generator furnace.

Fig. 2 is an elevation in section of a portion of the valve embodying my invention shown in Fig. 1.

Fig. 3 is an enlarged fragmentary perspective view of one of the valve members.

Fig. 4 is a transverse section, partly in diagram, of the valve port embodying the invention.

Fig. 5 is an enlarged partial section showing the valve member in dotted lines at zero opening and in full lines at the maximum effective port opening.

Figs. 6 and 7 are graphs showing discharge coefficient values plotted against valve lifts under a plurality of differential pressures across a regulating valve with and without the improvement embodying my invention.

Having reference to Fig. 1 of the drawings, a control valve 10 embodying my invention is shown in combination with an instrument 11 for varying the flow of fuel oil in a line 12 to a battery of burners 13 in the combustion chamber 14 of a boiler 15 in accordance with combustion requirements in a system wherein the quantity input of fuel oil passing through the valve must be maintained substantially at a selected ratio with the quantity of air supplied in order that maximum efficiency may be maintained. Air is supplied, by means not shown, through a duct 16 to the combustion chamber 14 as required by the steaming demand, and the instrument 11, responsive to the differential draft pressure across the boiler furnace 17 through connections 18 and 19 and supplied with fluid under a set pressure as governed by a reducing valve 20 connected by a pipe 21 with a fluid pressure source not shown, varies the opening of control valve 10 in direct proportion to the quantity of air supplied to the furnace. The control valve 10 includes a diaphragm chamber 22, connected with the instrument 11 by means of a pipe 23, having its lower wall defined by a diaphragm 24 which is backed by a suitable spring 25 in a manner well known to those skilled in the art. The diaphragm is in operative connection with a valve member 26, shown in Figs. 2 and 5, by means of a stem 27 which extends through a central bore in the valve member 26 and is connected therewith by threads 28 and a nut 29. The arrangement is such that a rise in air pressure in diaphragm chamber 22 moves the valve member 26 down increasing the valve lift a corresponding amount and vice versa so that the pressure in the diaphragm chamber 22 is an exact measure of valve lift.

The burners 13, provided with detachable tips 30, are connected by individual pipes 31 with a manifold 32 which is connected in turn with the supply line 12. Inasmuch as the efficient operating range of a burner tip is limited, different sizes of tips 30 may be required to take care of the entire steaming range. One size of tip may be used for low to medium steaming conditions and another size of tip may be employed for medium to maximum steaming conditions. Fuel oil is fed to the control valve 10 from an oil reservoir 33 by a constant capacity pump 34 at a rate and pressure in excess of the burner requirements, the excess oil being returned to the oil reservoir through a return line 35 under the control of a differential pressure valve 36. In practice, maximum burner efficiency is obtained by maintaining a constant pressure differential across the control valve 10, for example, a differential pressure of 10 lbs. when small burner tips 30 are in use and a differential pressure of 60 lbs. when large tips are employed.

The differential pressure valve 36 includes a sealed spring chamber 37 which is separated from a second chamber 38 by a diaphragm 39, the former chamber being in communication with the supply line 12, at the downstream side of the control valve 10, by means of a pipe 40 and the latter chamber being connected through the body of the valve 36 with the supply line 12 at a point between the control valve 10 and the pump 34. An adjustable compression spring 41 operates in conjunction with the downstream pressure to maintain the desired differential across the control valve 10. Thus, while the quantity of oil passing through the control valve 10 at a given opening under a pressure differential of 60 lbs. when the large burner tips 30 are being used, is greater than the quantity passing through the same opening under a pressure differential of 10 lbs. when the small burner tips are employed, the control valve may operate over its entire range to vary the supply of fuel oil to each set of burner tips on a quantity basis which may be at a predetermined ratio to a change in the quantity of air supplied to the furnace 17, provided the quantity of oil passing through the control valve is linear with valve lift. In operation, when the draft increases, a corresponding increase in draft pressure differential occurs and the instrument 11 responds to increase the opening of the control valve 10 on the linear basis referred to above and when the draft decreases, the opposite occurs.

Referring to Fig. 2, the control valve 10 is provided with a body 45 having inlet and outlet chambers 46 and 47, respectively, separated by a partition 48 and in communication with the supply line 12 by means of suitable threaded connections 49 and 50. The inlet chamber 46 is closed at the top by a flanged bonnet 51 secured by stud bolts 52 and the outlet chamber 47 is closed at the bottom by a blank flange 53 detachably connected, as by stud bolts 54. The upper end of the bonnet 51 supports a yoke 55 (see Fig. 1) on which the diaphragm 24 and spring 25 are mounted.

As herein shown, the valve member 26 is in the form of a cylinder which is slidably mounted in a through passage 56 axially disposed in a sleeve member 57 consisting of an upper cylindrical portion 58 and a lower cylindrical portion 59 of reduced diameter. The upper portion 58 is threaded at 60 into the partition 48 and has an annular flange 61 for making a tight joint therewith and the lower portion 59 extends into the outlet chamber 47, as shown. The valve member 26 cooperates with a slot shaped port 62 disposed in the wall of the lower sleeve portion 59, preferably on the side nearest to the body outlet connection 50, the longitudinal axis of the port being in parallel with the axis of the cylindrical valve member 26. The valve member 26 and the sleeve member 57 including the port 62 constitute means for varying the quantity of oil passing through the valve body 45 on a basis which is linear with valve lift in a manner now to be described.

The port 62 is of uniform width throughout its length so that as the valve member 26 moves down and uncovers the port to permit the passage of oil from the inlet chamber 46 to the outlet chamber 47 through the central passage 56 in the sleeve member 57, it provides a change in port area which is linear with valve lift, and by valve lift is meant the distance that the valve member has moved from a position at which the port is closed. Therefore, the change in port area is proportional to the change in operating pressure in the diaphragm chamber 22 by which the valve movement is effected. At first, a straight sided port was used and it was found that the quantity of oil passing through the valve at a small port opening under a 10 lbs. pressure differential, varied from the quantity passing through the valve at a maximum port opening under the same pressure differential, on a basis which departed from linear by as much as 15%; and it was also found that at a given valve lift, under pressure differentials which varied from 10 lbs. to 60 lbs., the quantity of oil passing through the valve varied from theoretical by as much as 15%. The change in port area from minimum to maximum combined with a change in pressure differential from 10 lbs. to 60 lbs. produced an over-all cumulative effect resulting in a variation in actual quantity flow from the calculated quantity flow of as much as 20%. Since the error factor thus introduced is far greater than the error factor permitted for the efficient operation of the system, a valve including a straight sided port was not suitable for the purpose.

Repeated tests were made with a valve using a straight sided slot shaped port ranging from low flows under a 5 lb. differential pressure across the valve to high flows under a 70 lbs. differential pressure across the valve. It was found that the change in coefficient of discharge under these test conditions amounted to as much as 20% and that the change in the coefficient of discharge was caused by the partially cumulative effect of changes in the coefficient of velocity and in the coefficient of contraction amounting to as much as 15% for each coefficient. The problem therefore presented was to provide a valve member and cooperating port wherein a change in port area is directly proportional to valve lift and whereby, under changing port areas and pressure drops across the valve, the coefficient of discharge remains substantially constant.

After carrying on extended tests, I discovered that the coefficient of velocity and the coefficient of contraction could be made to remain substantially constant under varying port areas and changing pressure drops. Referring to Fig. 4, this was accomplished by bevelling the upstream edges of the port 62, as indicated at 63, to provide an angle of approach $\phi$ having a depth D combined with a port width W and a port depth T. By means of the valve herein described, it was found that the maximum change in the coefficient of discharge throughout a range of valve travel from flows of approximately 10% to maximum and a range of differential pressure change from 5 lbs. to 70 lbs. was approximately 4% instead of the 20% error obtained with the straight sided port. Inasmuch as a 4% deviation in the coefficient of discharge is the measure of the error in the quantity of oil supplied to the burners, and since a maximum error of 4% in quantity does not materially affect the functioning of the system, the combustion control outlined above was commercially successful.

In the control valve illustrated, the port 62 is rectangular in shape and is provided with side walls each of which includes a straight sided portion 64, shown in Figs. 3 and 4, disposed in parallel with the axis of the valve member 26 and also in parallel with the transverse axis 65 of the port shown in dotted lines in Fig. 4. In this description, the dotted line 65 may conveniently be referred to as the port axis or axis of flow which serves to distinguish this axis from the longitudinal port axis referred to above. In addition, the port 62 also includes an entrance portion 66 having the wall portions 63, referred to above, each of which is beveled at an angle to the plane of the straight sided portions 64 of the port to provide a converging included angle of approach of approximately 60°, each wall portion 63 making an angle $\phi$ of approximately 30° to the plane of the side wall portions 64 and to the transverse axis 65 of the port. The depth D of each bevel is substantially 25% of the depth T of the port 62 and the width W of the port is equal to its depth T.

Referring to Fig. 5, the port has squared ends 67 and 68 which are parallel with each other. The upper end 67 is in a plane which is at right angles to the planes of the side wall portions 64 and is in parallel with the upper surface 69 of the valve member 26. The upper end 67 of the port coacts with the upper surface 69 of the valve member to constitute the zero position in the valve member travel or, in other words, the zero port opening. The over-all travel of the valve member 26 from its zero position, diagrammatically indicated in dotted lines at Z in Fig. 5, to its position of maximum opening, indicated in full lines at O in the said figure, establishes the maximum effective length L of the port 62. In the valve illustrated, the maximum effective length L in respect to the port width W is on the order of magnitude of twenty to one. Furthermore, the minimum transverse area of the inlet passage and outlet passage in the valve body should be considerably greater than the maximum effective port area so that the velocity of flow to and from the port 62 will not appreciably affect the coefficient of port discharge. In the valve shown, the minimum transverse area of the inlet and outlet passages is at the sleeve passage 56 and the ratio of the effective transverse area of the passage 56 in respect to the maximum effective area of the port 62 is approximately ten to one.

Inasmuch as the depth and width of the port 62 may be relatively minute when the valve capacity is small, the wall of the cylindrical portion 59 may be too thin to provide sufficient strength for the operating conditions. As shown in Fig. 4, this difficulty is overcome by providing a cut back portion 70 at the discharge side of the port having a depth Y and a width X which, irrespective of the depth Y, should be at least two times the width W of the port but preferably more as herein illustrated, for example, four times the port width. Thus, the wall thickness of the cylindrical portion 59 may have ample strength for the purpose without affecting the flow characteristics of the valve.

Referring again to Figs. 4 and 5, I have found that the dimensional figures given above may be varied within certain critical limits without substantially affecting the linear flow characteristics. The angle of approach may vary from an angle of 25° to the axis 65 of the port 62 to an angle of 45° to said axis; the depth D of the angle of approach may vary from 20% of the port depth T to 45% of said depth; and the depth T of the port may vary from 75% to 150% of the port width W without appreciable effect. In practice, the maximum effective length L of the port should preferably not be less than 7½ times the port width W because as the valve closes and the effective port length is reduced by the valve member 26 to a point at which the port length approaches the port width, the coefficient of discharge tends to deviate beyond the limits of 4% referred to above. The effective port length and width may be determined to take care of the maximum flow desired under a given range of pressure differential change and, from the dimension W, the depth of the port 62 may be readily figured within the dimensional limits specified. Furthermore, the effective transverse area of the sleeve passage 56 should not be less than twice the maximum effective area of the port.

The dimensional limits, noted above, have been obtained from repeated tests and I have found that dimensional changes beyond the aforesaid limits of variation affect the flow characteristics of the valve to a marked degree so that the valve is impractical for controlling flow under varying pressure drops on a quantity basis which is substantially linear with valve lift.

Referring to Fig. 6, I have illustrated a graph, based upon actual tests conducted with a valve embodying my invention, showing the values of the coefficient of discharge, indicated as the ordinates, at various valve lifts, indicated as the abscissa, under a plurality of pressure differentials from 5 lbs. to 70 lbs., as shown. It will be observed that the total variation in the values of the coefficient of discharge remains within 4% under the range of differential pressures shown and it will be noted also that the change in the value of the coefficient of discharge at any one differential pressure setting, is within 2%. In carrying out these tests, the fluid used was oil having a gravity of S. A. E. 10 flowing at a temperature of approximately 110° F. It was found, however, that temperature changes resulting in a variation of viscosity on the order of 400 to 100 S. S. U. had very little effect on the results obtained.

The graph shown in Fig. 7 serves as a means for comparing the results illustrated in Fig. 6 with results obtained from tests conducted under identical conditions with the same valve provided with a straight sided port of the same length L, width W and depth T as the port 62, but without the modifications embodying my invention. It will be noted that the change in values of the coefficient of discharge under the same range of pressure differentials, is greater than 20%.

While I have shown and described in detail certain preferred embodiments of my invention, it is understood that the matter hereinabove set forth or shown in the accompanying drawings is by way of illustration only and is not to be interpreted in a limiting sense.

I claim:

1. A regulating valve for governing fluid flow on a quantity basis which is substantially linear with valve lift, including in combination, a valve body having inlet and outlet chambers, a first member disposed between said chambers including an elongated control port of substantially uniform width providing for fluid communication therebetween, a second member cooperating with said port for varying the effective length of the port opening, and means for moving one of said members in respect to the other, said port having a width W defined by side wall portions disposed substantially in parallel with the port axis, and having a depth T including said side wall portions and an entrance portion, said entrance portion having a depth D and having converging wall portions the tangential plane to the surface of each of which makes an angle $\phi$ with said port axis, the angle $\phi$ having a value of not less than 25° or more than 45°, and the dimensions T, W and D having relative values wherein T is not less than 75% or more than 150% of W and D is not less than 20% or more than 45% of T.

2. A regulating valve for governing fluid flow on a quantity basis which is substantially linear with valve lift, including in combination, a valve body having inlet and outlet chambers, a first member disposed between said chambers including an elongated control port of substantially uniform width providing for fluid communication therebetween, a second member cooperating with said port for varying the effective port opening, and means for moving one of said members in respect to the other, said port having a width W defined by side wall portions disposed substantially in parallel with the port axis, and having a depth T including said side wall portions and an entrance portion, said entrance portion having a depth D and having wall portions converging at an angle $\phi$ with said port axis, the angle $\phi$ having a value of not less than 25° or more than 45°, and the dimensions T, W and D having relative values wherein T is not less than 75% or more than 150% of W and D is not less than 20% or more than 45% of T.

3. In a valve for controlling fluid flow, including a body having inlet and outlet chambers and a partition therebetween, the combination with a sleeve member mounted in said partition having a slot shaped port, a valve member slidably mounted in said sleeve member for varying the effective port length, and means for reciprocating said valve member, of side walls defining the width of said port disposed substantially in parallel with the axis of said sleeve which walls include a straight sided portion and an entrance portion, the walls of said straight sided portion being substantially in parallel with the axis of said port and the walls of said entrance portion converging at an angle of not less than 25° or more than 45° to said port axis, the depth of said entrance portion being not less than 20% or more than 45% of the depth of said combined portions, and the depth of said combined portions being not less than 75% or more than 150% of the width of said port.

4. In a valve for controlling fluid flow, including a body having inlet and outlet chambers and a partition therebetween, the combination with a sleeve member mounted in said partition having a slot shaped port and extending into one of said chambers, a valve member slidably mounted in said sleeve member for varying the effective port length, and means for reciprocating said valve member, of side walls defining the width of said port disposed substantially in parallel with the axis of said sleeve which walls include a straight sided portion and an entrance portion, the walls of said straight sided portion being substantially in parallel with the axis of said port and the walls of said entrance portion converging at an angle of not less than 25° or more than 45° to said port axis, the depth of said entrance portion being not less than 20% or more than 45% of the depth of said combined portions, and the depth of said combined portions being not less than 75% or more than 150% of the width of said port.

5. In a valve for controlling fluid flow on a basis which is substantially linear with valve lift, including a body partitioned to define inlet and outlet chambers, the combination with a sleeve member mounted in the body partition having a cylindrical portion extending into the outlet chamber the wall of which sleeve member includes a slot shaped port disposed substantially in parallel with the sleeve axis, said port having oppositely disposed side walls each including a straight sided portion substantially in parallel with the port axis and each including an entrance portion converging to the said straight sided portion at an angle of not less than 25° or more than 45°, the depth of said entrance portion being not less than 20% or more than 45% of the depth of said port, and the combined depth of said straight sided portion and said entrance portion being not less than 75% or more than 150% of the minimum port width, a cylindrical valve member slidably mounted in said sleeve and cooperating with said port, and means for reciprocating said valve member to vary the effective port area.

6. In a valve for controlling fluid flow including a body partitioned to define inlet and outlet chambers, a sleeve member mounted transversely of the body partition having a portion extending into said outlet chamber, said sleeve member having a central passage and having a slot shaped port in the wall thereof disposed substantially in parallel with the sleeve axis to provide for fluid communication between said chambers, said port having an entrance portion converging in the direction of flow at an angle ranging from 25° to approximately 45° to the port axis, the depth of said entrance portion ranging from 20% to 45% of the port depth, and the maximum effective transverse area of said port being not more than 50% of the transverse area of the central passage in said sleeve, a cylindrical valve member slidably mounted in said sleeve to cooperate with said port, and means for reciprocating said valve member to vary the effective port area.

7. In a valve for controlling fluid flow having a control port, the combination with a valve member cooperating with said port, of walls at the sides of said port each having a straight sided portion substantially parallel with the port axis, which portion is not less than 55% or more than 80% of the port depth, and having an entrance portion, which portion has wall portions converging, in the direction of flow, toward the axis of flow, the tangential plane to the surface of each of which wall portions makes an angle with the axis of flow of not less than 25° or more than 45° and the combined depth of said straight sided portion and said entrance portion being not less than 75% or more than 150% of the port width.

8. In a valve for controlling fluid flow having a control port, the combination with a valve member cooperating with said port, of walls at the sides of said port each having a straight sided portion substantially parallel with the port axis, which portion is not less than 55% or more than 80% of the port depth, and having an entrance portion, which portion has wall portions converging, in the direction of flow, toward the axis of flow, the tangential plane to the surface of each of which wall portions makes an angle with the axis of flow of not less than 25° or more than 45°, and a cut back portion at the discharge side of said port, the combined depth of said straight sided portion and said entrance portion being not less than 75% or more than 150% of the port width, and the port width being not more than 50% of the width of said cut back portion.

ALFRED C. D'ARCEY.